United States Patent [19]

Fehrenbach et al.

[11] 4,327,767
[45] May 4, 1982

[54] PRESSURE CONTROL VALVE

[75] Inventors: Siegfried Fehrenbach, Markgröningen; Eberhard Utz, Stuttgart; Kurt Herbst, Burgstetten, all of Fed. Rep. of Germany

[73] Assignee: Robert Bosch GmbH, Stuttgart, Fed. Rep. of Germany

[21] Appl. No.: 124,047

[22] Filed: Feb. 25, 1980

[30] Foreign Application Priority Data

Mar. 30, 1979 [DE] Fed. Rep. of Germany ....... 2912799

[51] Int. Cl.$^3$ .............................................. F16K 31/12
[52] U.S. Cl. ...................................... 137/510; 251/85; 251/86
[58] Field of Search ...................... 137/510; 251/85, 86

[56] References Cited

U.S. PATENT DOCUMENTS

| 1,927,609 | 9/1933 | Markert | 137/510 |
| 2,261,365 | 11/1941 | Grove | 137/510 |
| 2,311,110 | 2/1943 | Johnson | 137/510 |
| 3,288,165 | 11/1966 | Cranage | 137/510 X |
| 3,511,270 | 5/1970 | Fehrenbach | 251/86 X |
| 3,542,333 | 11/1970 | Stampfli | 251/85 |

FOREIGN PATENT DOCUMENTS

| 2354461 | 5/1975 | Fed. Rep. of Germany | 137/510 |
| 2263383 | 7/1975 | France | 137/510 |

Primary Examiner—Harold W. Weakley
Attorney, Agent, or Firm—Edwin E. Greigg

[57] ABSTRACT

A pressure control valve to control the pressure of a fluid in a fluid system so that it remains constant. This type of valve can be utilized as element of a fuel injection system for internal combustion engines, and has storage means which are independent of the valve member, and actuatable by the pressure of the fluid. The pressure control valve comprises a housing and a support assembly urged toward a valve seat by a control spring. Additionally, a storage spring in the support assembly urges a closing member toward the valve seat. The closing member is slidably received in a bore in the support assembly. The support assembly is connected to a membrane which is tensioned between the housing members. Other variations of this device are also revealed herein.

3 Claims, 6 Drawing Figures

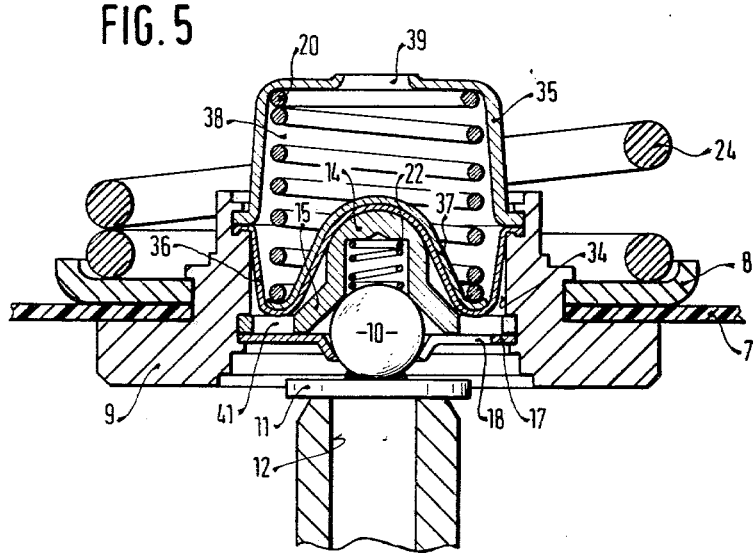
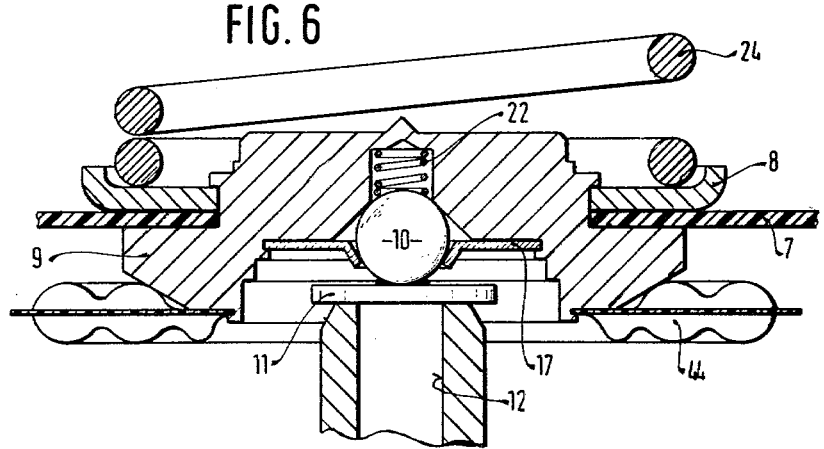

PRESSURE CONTROL VALVE

BRIEF SUMMARY OF THE INVENTION

The present invention is directed to improvements in pressure control valves having stationary valve seats cooperating with spring-loaded valve assemblies and the like.

BACKGROUND OF THE INVENTION

Already known in the prior art is a pressure control valve as an element of a fuel injection system for internal combustion engines, the object of which is to maintain as closely as possible a constant pressure in the injection valve. After the fuel pump has been switched off, the pressure control valve shuts, and as a result the pressure in the fuel line and in the fuel injection system assembly decreases at various places where leakages occur. With each repeated starting up of the internal combustion engine, it is then primarily necessary to rebuild the pressure in the fuel injection system, and even to rid the fuel injection system of the vapor which may have built up. This creates difficulties and renders delays in starting unavoidable.

OBJECT AND SUMMARY OF THE INVENTION

The object of the invention is to provide a pressure control valve which, after it has been shut, acts as a chamber which, after the fuel feeding source has been shut off, renews the fluid leaking out of the fluid system for a sufficiently long period of time, thus maintaining the fluid system ready for repeated usage.

The invention will be better understood and further objects and advantages thereof will become more apparent from the ensuing detailed description of preferred embodiments taken in conjunction with the drawings.

BRIEF DESCRIPTION OF THE DRAWINGS

FIGS. 3, 4, 5, and 6 are schematic sectional representations of a respectively second, third, fourth, and fifth embodiments of a pressure control valve.

DESCRIPTION OF THE PREFERRED EMBODIMENTS

Figure 1:
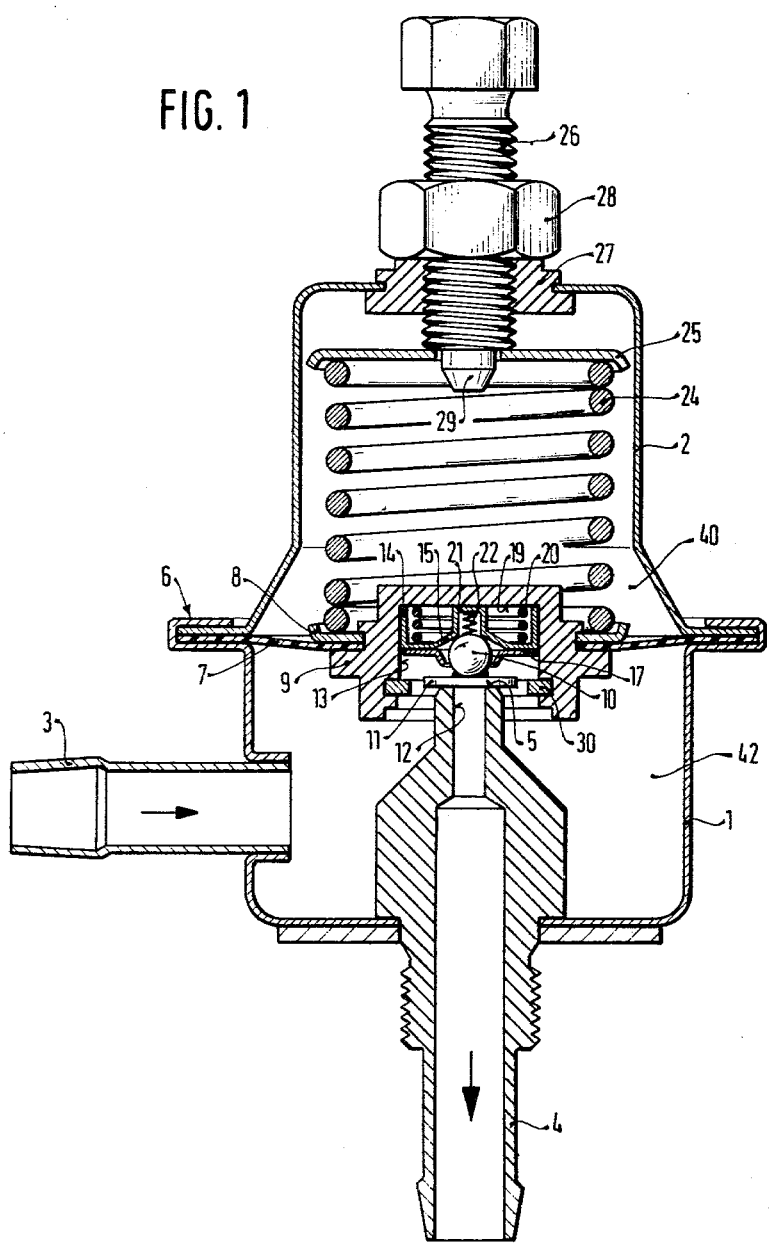
FIG. 1 is a cross-sectional view of a first embodiment of a pressure control valve.
Figure 2:
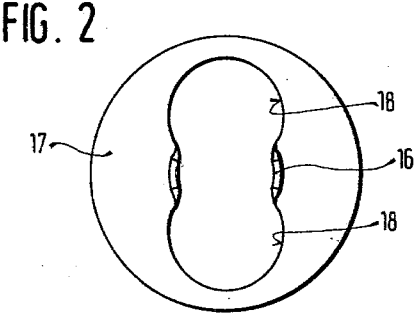
FIG. 2 shows in a plan view the retaining disc of a pressure control valve.

Turning now to the drawings, the pressure control valve shown in FIG. 1 comprises a housing component 1 and a housing component 2, in which at least an inlet nipple 3 and an outlet nipple 4 are appropriately secured to the housing component 1. The inner terminal portion of the outlet nipple 4 forms a rigid valve seat 5. The two housing parts 1 and 2 are secured to one another by means of a crimped flange 6 which also serves as a clamp for a tensioned membrane 7 which extends within and across the housing normal to the longitudinal axis thereof. The membrane 7 can either be constructed as a flat yielding membrane or as a flexible diaphragm. The membrane 7 is provided with a support assembly 9 clamped to it by means of a spring seat 8. The support assembly 9 is provided with a spring loaded valve assembly, the details of which will be better understood from the following disclosure. The valve plate or seat 11 which may be soldered to the ball 10 serves as the closing member of the pressure control valve and opens a valve port 12 into the rigid valve seat 5 to a greater or lesser degree. The ball 10 is retained within a guide bore 13 of the support assembly 9, in which an adapter member 14 is disposed. The adapter member 14 is constructed, for instance, from a sheet metal body and includes coaxially with the guide bore 13 a conical region 15, against which on the one hand a zone of the ball 10 can be supported, while on the other hand, another zone of the ball is localized by a retaining disc 17, which includes support tongues 16 (see FIG. 2). The retaining disc 17 is provided with two eccentric openings 18 (FIG. 2) through either of which the ball 10 can be introduced, this disc being arranged to be guided to the outer circumference of said ball by means of the guide bore 13. The retaining disc 17 can be rigidly secured (for example, soldered or welded) together with the adapter member 14. A storage spring 20 is arranged to abut against the base 19 of the guide bore 13 and acts upon the support assembly 9 to shift it in the direction of the valve seat 5. Disposed within the cap 21 which is integrated with the adapter member 14 in the region of the ball 10 is an axially extending brake spring 22, the object of which is to force the ball 10 away from the conical region 15 of the adapter member 14 toward the retaining disc 17, so that the ball is urged toward a seat on the valve port 12. This prevents the ball 10, and with it the valve disc 11, from being set in motion by vibrations and further from being set in rotation by the fluid flow. The support assembly 9 is subjected to the force of a control spring 24, which urges the spring seat disc 8 in the direction of closing the valve. The end of the control spring 24 which is not in contact with the support assembly 9 rests, in the exemplary embodiment of the pressure control valve, against a spring seat disc 25 which is in abutment with an adjusting screw 26. The adjusting screw 26 is threadedly engaged in a bushing 27 secured to the frontal face of housing part 2 and is adapted to be locked by means of a nut 28. The spring seat disc 25 is centered in the housing 2 by means of a pin 29 axially secured to and extending from the adjusting screw 26.

A stop disc 30 which is disposed in a channel in the support assembly 9 limits lateral motion of the adapter member 14 toward the valve seat 5.

The method of operation of the pressure control valve in is as follows: FIG. 1 shows the pressure control valve in its closing position, wherein a storage effect is no longer present. When a fluid pump, a fuel pump for instance, is switched on, fluid flows through the inlet nipple 3 of the pressure control valve, said fluid opposing the force of the control spring 24 and lifting the membrane 7 together with its associated parts from the rigid valve seat 5. The force of the storage spring 20 thus presses the valve disc 11 against the rigid valve seat 5 long enough for the retaining disc 17 to come to rest against the stop disc 30 and for the support assembly 9 to end the storage lifting of the membrane 7. The pressure control valve is now loaded in its storage function and assumes its normal pressure control function of controlling the fluid pressure, determined by the force of the control spring 24, upstream of the valve port 12 and upstream of the inlet nipple 3, so that it remains constant. Now, should the fluid supply be interrupted, the pressure control valve shuts. The adapter member 14 then assumes the position, in which the assembly of FIG. 1 is as shown in the drawing. The pressure control valve now functions as a storage chamber to replace the leaking fluid, until the adapter member 14, working counter to the force of the storage spring 20, in the guide bore 13 comes sliding back to the base of said guide bore 13.

Figure 3:
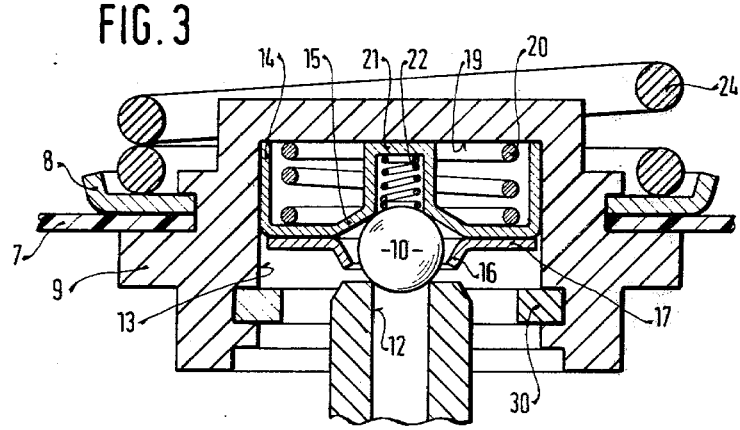

The second embodiment, represented only partially in FIG. 3 differs from the first embodiment according to FIG. 1 only in that the function of the closing member is not served by a valve disc as in FIG. 1, but by a ball 10 which assumes this function simultaneously. The method of operation of this embodiment corresponds to the method of operation of the first embodiment according to FIG. 1.

Figure 4:
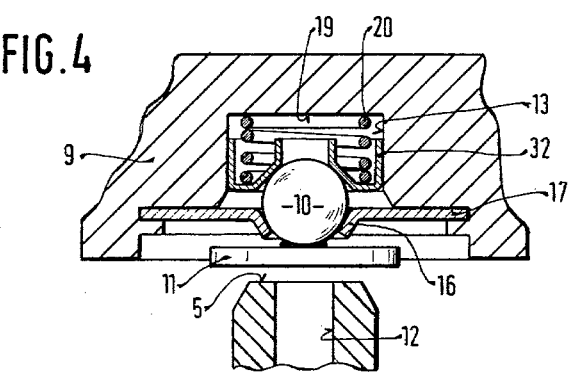

In the third embodiment according to FIG. 4, components corresponding to those on previous embodiments have been assigned the same reference numerals. The pressure control valve represented only partially in FIG. 4 differs from the pressure control valve according to FIG. 1 essentially in that the retaining disc 17, through which the ball 10 is introduced on one side, is relatively rigidly secured to the support assembly 9. On the other side, the ball 10 is led into an adapter 32 which is slidable within the guide bore 13. The storage spring 20 which engages the adapter 32 urges the ball 10 against the tongues 16 of the retaining disc 17. At the same time, the storage spring 20 assumes the function of the brake spring according to the embodiment in FIG. 1. FIG. 4 shows the pressure control valve in its open position. The function of the embodiment according to FIG. 4, with respect to pressure control and storage effect, is the same as in the previous embodiments.

In the fourth embodiment according to FIG. 5, components corresponding to those on previous embodiments have been assigned the same reference numerals. In this particular embodiment, the ball 10, with the valve disc 11 to which it is secured, is lodged between the adapter member 14 and the retaining disc 17 in a swivelable manner. The retaining disc 17, for instance, can be fitted into the support assembly 9. The support assembly 9 shows a passage opening 34, in which a cap 35, positioned within the housing component 2, can be secured by means of deformation. Secured at the same time to the cap 35 within the opening 34 is an elastic storage membrane 36, which extends straight across the opening and against which lies, over a spring seat disc 37, the storage spring 20 which adjoins the cap 35 on the other side. The space 38 formed between storage membrane 36 and cap 35 is connected, by an opening 39, to the space 40 defined by housing component 2, which can be, for instance, in contact with the atmosphere. By means of the eccentric openings 18 in the retaining disc 17, and the openings 41 in the adapter member 14, the fluid pressure present in the space 42 defined by the housing component 1 can on the other hand affect the storage membrane 36 and arch it away from the adaptor member 14 in the direction of the cap 35, until for instance the spring seat disc 37 comes to rest against the cap base, and the chamber formed between the storage membrane 36 and the passage opening 34 is completely loaded. Storage spring 20 and storage membrane 24 are adapted to each other in such a way, that the onset of the fuel delivery causes first the chamber 34, 36 to fill up; then is the control pressure of the pressure control valve attained and the valve disc 11 lifted from the valve seat 5. FIG. 5 represents the pressure control valve in an unpressurized condition.

The storage means 34, 35, 36 depicted in FIG. 5 must not necessarily be disposed within the support assembly 9, but can be located in some other place within the valve housing 1, 2, in such a way as to still be connected to space 42.

According to the fifth embodiment as in FIG. 6, the function of the storage means can also be served by a hermetically closed box or bellows 44, which can be subjected to the pressure in the space 42. The box or the bellows 44 can be associated with the support assembly 9 or in some other place of the space 42. By onset of the fuel delivery, the box or bellows 44 is pressed together long enough, for the control pressure to be attained. Should the fluid supply be interrupted, then the pressure control valve shuts, and the expanding box or bellows 44 maintains a pressure in the fluid system for a predetermined length of time. FIG. 6 represents the pressure control valve in its unpressurized condition. The components corresponding to the previous embodiments have been assigned the same reference numerals.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. A pressure control valve comprising
 a housing,
 a membrane within said housing and extending across a space enclosed thereby,
 a biasing spring positioned between said housing and said membrane on one side thereof;
 a supporting assembly secured to said membrane on its side opposite from said biasing spring;
 an axially aligned bore in said support assembly;
 a spring-loaded valve assembly slidably disposed in said bore in said supporting assembly,
 said spring loaded valve assembly including a cup shaped adapter slidable within said bore, said adapter including an axially aligned conical region and cap inside thereof;
 a storage spring in said bore between said support assembly and said adapter and surrounding said cap;
 an axially aligned stationary valve seat positioned coaxial with said valve assembly cooperating with said spring-loaded valve assembly;
 a retaining disc fastened to said adapter in spaced relation relative to said stationary valve seat,
 a ball valve retained by said retaining disc, and
 an axially disposed secondary spring means in said cap of said spring-loaded valve assembly which engages a zone of said ball valve inside of said conical region, said ball element cooperating with said stationary valve seat to control fluid flow therethrough.

2. A pressure control valve as defined in claim 1 wherein said spring loaded valve assembly is swivably supported relative to said stationary valve seat.

3. A pressure control valve as defined in claim 1, wherein said secondary spring urges said ball element in the direction of said retaining disc.

* * * * *